Jan. 6, 1925.

C. C. HANSEN

ROCK DRILL MOUNTING

Filed May 31, 1924

1,522,240

INVENTOR
Charles C. Hansen
BY
Herbert G. Ogden
HIS ATTORNEY

Patented Jan. 6, 1925.

1,522,240

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

ROCK-DRILL MOUNTING.

Application filed May 31, 1924. Serial No. 717,137.

*To all whom it may concern:*

Be it known that I, CHARLES C. HANSEN, a citizen of the United States, and a resident of Easton, county of Northampton and State of Pennsylvania, have invented a certain Rock-Drill Mounting, of which the following is a specification accompanied by drawings.

This invention relates to rock drills, but more particularly to rock drill mountings of the type employed for supporting drifters.

The drifter type of rock drill is adapted to be supported for drilling on a shell or mounting which includes a slide groove or guide and a screw for feeding the drill forward as the steel drills into the rock. In order to remove the drill from the shell, the feed screw is turned to unscrew the nut on the drill thereby sliding the drill forward and out at the front end of the shell. Usually the feed screw is fixed only at the rear end so that the drill may be easily removed from the mounting, and in this case, the forward end of the feed screw is free, permitting vibration as the drill operates. Damage is apt to be occasioned by the feed screw striking against the surrounding parts ruining the thread and sometimes breaking the feed screw. Supports for the end of the feed screw have been provided heretofore for preventing the vibration of the feed screw with the drill, but these supports have been of such a nature that they have been easily lost or parts mislaid upon removing them to replace the drill. These operations are usually carried on in darkness in the mine, and any parts which are removable are easily lost by miners.

It is an object of this invention to support the feed screw of a drill mounting by means of an apparatus in which it is not necessary to remove parts in order to free the supported end of the feed screw.

Other objects of the invention will be in part obvious and in part pointed out hereinafter.

Figure 1:
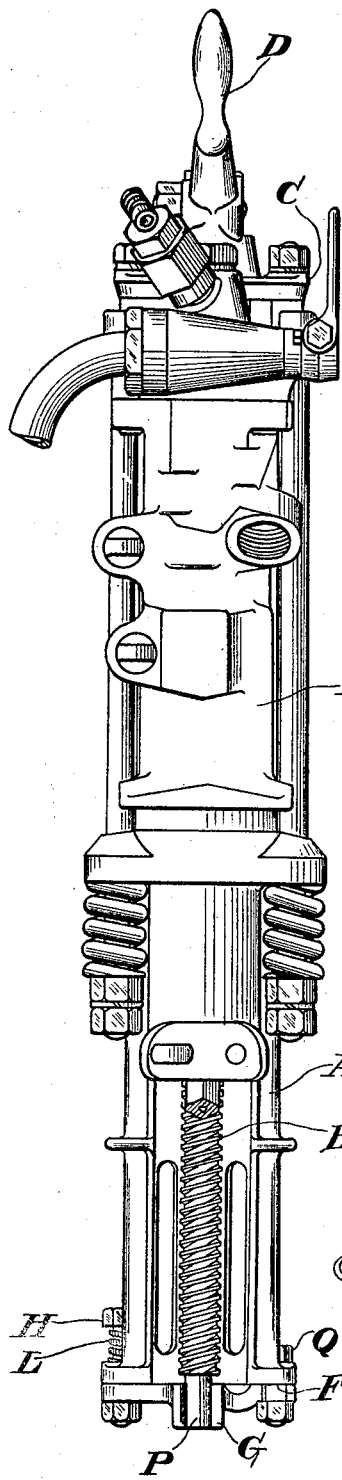
Figure 2:
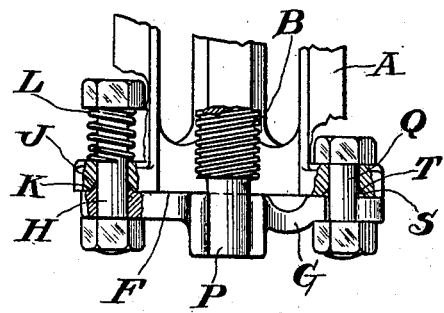
Figure 3:
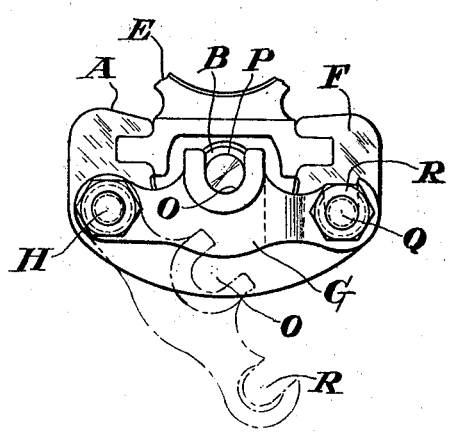

One form which the invention may assume in practice is illustrated in the following description and the drawings which include, Figure 1, a plan view of a drifter drill and mounting showing the feed screw supported in position thereon, Figure 2 is a plan view of the feed screw support and adjacent parts of the rock drill mounting, parts being in section to show details of construction, and Figure 3 is a front view of the rock drill mounting and feed screw support.

Referring to the drawings, the drill shell or mounting comprises a guide A having a feed screw B therewithin which is supported at the rear end by a cross head C and free at the front end, so that by rotating the feed screw as by means of the crank D, the drill E may be caused to move forwardly and be removed from the front end of the guide A.

On the front face F of the guide A there is mounted a feed screw support G to hold the feed screw B from vibrating while the drill E is in operation, thereby preventing injury to the threads on the feed screw. The support G is pivotally mounted at one end as by means of a bolt H there being provided a groove J about the bolt H in the face of the guide A with which a conical projection K on the support G cooperates to form a bearing. A spring L between the head of the bolt H and the rear side of the guide A may be provided to give a proper tension against the support G to hold it in place. Intermediate its ends, the screw support G is provided with a slot O, which is adapted to engage a cylindrical reduced end P of the feed screw B.

The feed screw support G is adapted to swing into and out of its screw supporting position as shown in Figure 3. When in its supporting position, it is adapted to be clamped by means of a bolt Q passing through the face of the guide A holding the support G rigidly in position. It is preferable that the support G be adapted to disengage the screw B without entirely removing the bolt Q and to this end, there is provided a slot R in the free end of the support G by means of which the support may be slipped under the nut of the bolt Q and there fastened in position. The support G is provided with a conical projection S adapted to cooperate with the recess or slot T in the face of the guide A so that when the bolt Q is tightened, the support G is rigidly held in position not only by the bolt, but by the coaction of the projection S and slot T.

It will be evident from the above description that in order to remove the drill E from the mounting A, it is not necessary to remove any parts of the support or its fastening means from the mounting A, the support G being adapted to be loosened by merely unscrewing the nut of the bolt Q and turning the support downwardly as shown in the dotted lines in Figure 3.

I claim:

1. A rock drill mounting comprising a guide, a feed screw within said guide, supported at one end of the guide and free at the other end, a support for the free end of the said screw pivotally mounted on the guide and adapted to engage the feed screw, a projection on said support, said guide being provided with a groove to receive said projection and a bolt extending through said guide adapted to hold the projection in the groove in said guide whereby said support is rigidly held in place.

2. A rack drill mounting comprising a guide, a feed screw within said guide, a support for the said feed screw having a slot intermediate its ends to support the feed screw, a bolt pivotally supporting said support at one end, a conical projection at the other end of said support, a second bolt on said guide, said guide being provided with a groove to receive said projection and a slot in said support to cooperate with said second bolt whereby said support is adapted to be held rigidly in place by said bolt.

In testimony whereof I have signed this specification.

CHARLES C. HANSEN.